United States Patent
Oikawa et al.

(10) Patent No.: US 8,605,410 B2
(45) Date of Patent: Dec. 10, 2013

(54) THIN-FILM CAPACITOR AND MANUFACTURING METHOD THEREOF

(75) Inventors: Yasunobu Oikawa, Tokyo (JP); Yoshihiko Yano, Tokyo (JP)

(73) Assignee: TDK Corporation, Tokyo (JP)

( * ) Notice: Subject to any disclaimer, the term of this patent is extended or adjusted under 35 U.S.C. 154(b) by 213 days.

(21) Appl. No.: 12/876,648

(22) Filed: Sep. 7, 2010

(65) Prior Publication Data

US 2011/0075317 A1    Mar. 31, 2011

(30) Foreign Application Priority Data

Sep. 29, 2009 (JP) ................... 2009-224801

(51) Int. Cl.
- H01G 4/005 (2006.01)
- H01G 4/30 (2006.01)
- H01G 4/228 (2006.01)
- H01G 4/20 (2006.01)
- H01G 4/06 (2006.01)
- H01G 9/00 (2006.01)

(52) U.S. Cl.
USPC ............. 361/303; 361/301.4; 361/306.3; 361/312; 361/313; 361/321.2; 29/25.03

(58) Field of Classification Search
USPC .......... 29/25.03; 361/301.1, 302, 303, 306.3, 361/307, 308.1, 312–313, 321.2, 761–764, 361/306.1, 301.4
See application file for complete search history.

(56) References Cited

U.S. PATENT DOCUMENTS

| | | | | |
|---|---|---|---|---|
| 4,811,162 A | * | 3/1989 | Maher et al. | 361/308.1 |
| 5,043,843 A | * | 8/1991 | Kimura et al. | 361/308.1 |
| 5,312,581 A | * | 5/1994 | Amano et al. | 419/8 |
| 5,712,758 A | * | 1/1998 | Amano et al. | 361/321.2 |
| 5,774,326 A | * | 6/1998 | McConnelee et al. | 361/313 |
| 6,118,647 A | * | 9/2000 | Okinaka et al. | 361/305 |
| 6,254,971 B1 | * | 7/2001 | Katayose et al. | 428/209 |
| 6,337,790 B1 | * | 1/2002 | Nellissen et al. | 361/306.1 |
| 6,794,729 B2 | | 9/2004 | Mori et al. | |
| 7,933,113 B2 | | 4/2011 | Motoki et al. | |
| 2007/0064374 A1 | * | 3/2007 | Togashi et al. | 361/307 |
| 2007/0074806 A1 | * | 4/2007 | Kojima et al. | 156/89.16 |
| 2011/0162180 A1 | | 7/2011 | Motoki et al. | |

FOREIGN PATENT DOCUMENTS

| | | |
|---|---|---|
| JP | 8-264381 | 10/1996 |
| JP | 11-288841 | 10/1999 |
| JP | A-2000-124056 | 4/2000 |
| JP | 2002-260959 A | 9/2002 |
| JP | 2003-347152 A | 12/2003 |
| JP | 2006-179954 A | 7/2006 |
| JP | A-2008-283170 | 11/2008 |
| JP | A-2009-155118 | 7/2009 |

* cited by examiner

*Primary Examiner* — Timothy Thompson
*Assistant Examiner* — Sherman Ng
(74) *Attorney, Agent, or Firm* — Oliff & Berridge, PLC

(57) ABSTRACT

To provide a thin-film capacitor capable of improving the stability of electric connection between an internal electrode layer and a connection electrode. The thin-film capacitor comprises: two or more dielectric layers deposited above a base electrode; an internal electrode layer being deposited between the dielectric layers and having a projecting portion which projects from the dielectric layer when seen from a laminating direction; and a connection electrode electrically connected to the internal electrode layer via at least a part of a surface and an end face of the internal electrode layer included in the projecting portion, wherein a ratio L/t between a projection amount L of the projecting portion of the internal electrode layer with respect to the dielectric layer and a thickness t of the internal electrode layer is 0.5 to 120.

6 Claims, 2 Drawing Sheets

THIN-FILM CAPACITOR AND MANUFACTURING METHOD THEREOF

BACKGROUND OF THE INVENTION

1. Field of the Invention

The present invention relates to thin-film capacitors and manufacturing methods thereof.

2. Related Background of the Invention

As with a laminated ceramic capacitor, for example, described in Patent Document 1 (Japanese Patent Application Laid-Open No. 2009-155118), a configuration is known wherein a dielectric layer and an internal electrode layer are alternately deposited to form a multilayer laminated body and wherein on both ends of this laminated body the internal electrode layer is connected to an external electrode.

SUMMARY OF THE INVENTION

However, in attempting to apply the configuration of the laminated ceramic capacitor described in Patent Document 1 to a thin-film capacitor in order to achieve a large capacity thin-film capacitor, the following problems may arise. In the case of the thin-film capacitor, an internal electrode layer is exposed on a side face of a dielectric layer with the use of a method of making a slit by dicing or the like or a method of forming a slit, a via, a through-hole, or the like by ion milling, and via this exposed portion the internal electrode layer is connected to a connection electrode (external electrode).

However, with these methods, only an end face portion of the internal electrode having a very thin film-thickness is exposed and the connection to the connection electrode is made only with this end face portion, and therefore the connection state between the internal electrode layer and the connection electrode is likely to be unstable. This connection instability results in a decrease in the production yield or a decrease in the reliability.

The present invention has been made in light of the above-described problems. It is an object of the present invention to provide a thin-film capacitor capable of improving the stability of electric connection between an internal electrode layer and a connection electrode and a method of manufacturing the thin-film capacitor.

In order to solve the above-described problems, a thin-film capacitor according to the present invention comprises: two or more dielectric layers deposited above a base electrode; an internal electrode layer being deposited between the dielectric layers and having a projecting portion which projects from the dielectric layer when seen from a laminating direction; a connection electrode electrically connected to the internal electrode layer via at least a part of a surface and an end face of the internal electrode layer included in the projecting portion, wherein a ratio $L/t$ between a projection amount $L$ of the projecting portion of the internal electrode layer with respect to the dielectric layer and a thickness $t$ of the internal electrode layer is 0.5 to 120.

Similarly, in order to solve the above-described problems, a method of manufacturing a thin-film capacitor according to the present invention comprises the steps of: forming a laminated body wherein a dielectric layer and an internal electrode layer are alternately deposited above a base electrode; exposing an end portion of the internal electrode layer so that it projects from the dielectric layer when seen from a laminating direction of the laminated body and performing wet etching so as to form a projecting portion; and forming a terminal electrode so as to be electrically connected to the internal electrode layer via at least a part of a surface and an end face of the internal electrode layer included in the projecting portion which is formed by performing the wet-etching, wherein the step of performing the wet etching forms the projecting portion by performing wet-etching so that a ratio $L/t$ between a projection amount $L$ of the projecting portion of the internal electrode layer with respect to the dielectric layer and a thickness $t$ of the internal electrode layer becomes 0.5 to 120.

According to such a thin-film capacitor and a method of manufacturing the thin-film capacitor, the internal electrode layer is connected to the connection electrode via at least a part of the surface and the end face of the internal electrode layer included in the projecting portion of the internal electrode layer, and therefore the contact area between the both can be increased and the connection state can be stabilized. Furthermore, because the projection portion is formed so that the ratio $L/t$ between the projection amount $L$ of the projecting portion of the internal electrode layer with respect to the dielectric layer and the thickness $t$ of the internal electrode layer becomes 0.5 to 120, the projection amount of the projecting portion can be within an appropriate range suitable to be able to connect the projecting portion and the connection electrode, and the connection state between the internal electrode layer and the connection electrode can be stabilized further. As a result, the stability of electric connection between the internal electrode layer and the connection electrode can be improved. Then, once the stability of the connection state is improved, the production yield will increase and the reliability will also improve.

Moreover, the method preferably includes the step of exposing the end face of the internal electrode layer after the step of forming the laminated body and prior to the step of wet etching. Thus, the amount of erosion of the dielectric layer by the wet etching treatment is fixed, and therefore the projection amount of the projecting portion of the internal electrode layer can be fixed, thereby suppressing the variations in performances of the thin-film capacitor and further improving the reliability.

The thin-film capacitor and the manufacturing method thereof according to the present invention can improve the stability of electric connection between the internal electrode layer and the connection electrode.

DESCRIPTION OF THE PREFERRED EMBODIMENTS

Figure 1A:
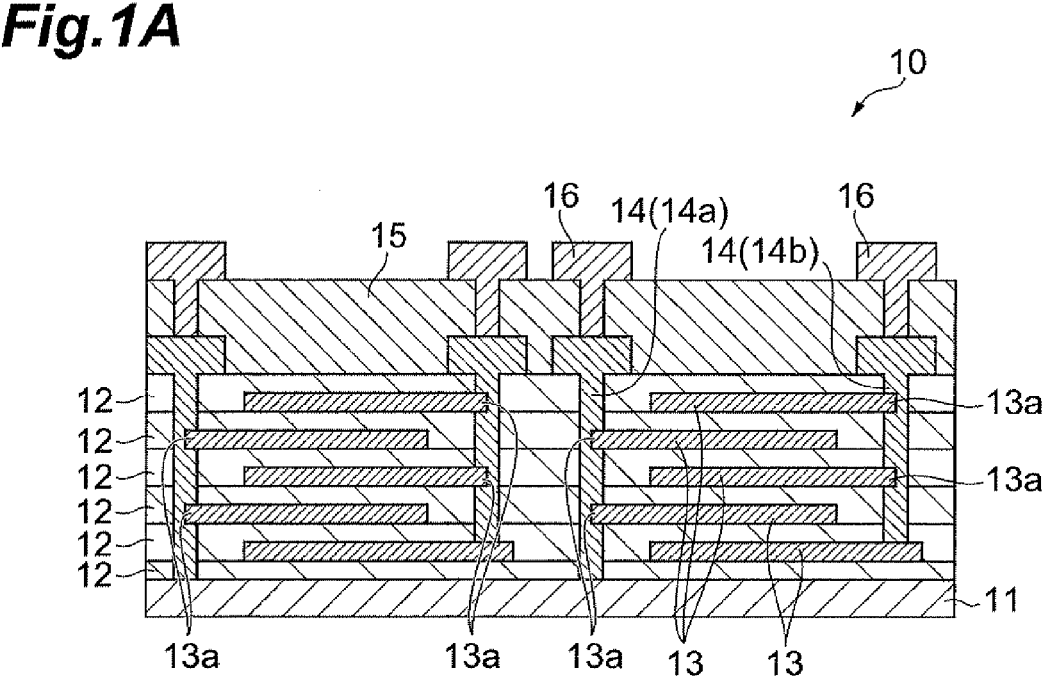
FIGS. 1A and 1B are schematic cross sectional views showing a structure of a thin-film capacitor according to one embodiment of the present invention.

Hereinafter, preferred embodiments of the present invention will be described. However, the present invention is not limited to the following embodiments. Note that the same or equivalent elements are given the same reference numeral to omit the duplicating description.

Figure 1B:
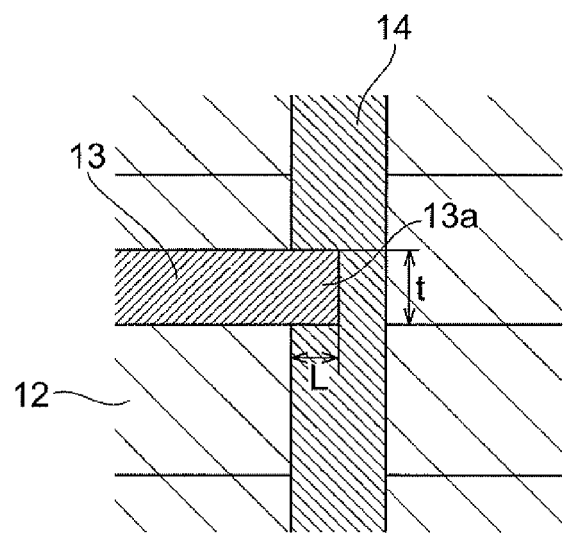

FIGS. 1A and 1B are schematic cross sectional views showing a structure of a thin-film capacitor 10 according to one embodiment of the present invention. As shown in FIG. 1A, the thin-film capacitor 10 comprises a base electrode 11, two or more dielectric layers 12 deposited above the base electrode 11, an internal electrode layer 13 deposited between the dielectric layers, a connection electrode 14 electrically connected to the internal electrode layer 13, a passivation film 15 as a surface protective film, and a terminal electrode 16.

The dielectric layer 12 and the internal electrode layer 13 are alternately deposited to form a laminated body. Note that, in FIG. 1A, the laminating state of the dielectric layer 12 and the internal electrode layer 13 is simplified and shown with six dielectric layers 12 and five internal electrode layers 13, while, in the thin-film capacitor 10 of this embodiment, a laminated body of up to several hundreds dielectric layers 12 and internal electrode layers 13 can be formed.

Moreover, as shown in FIG. 1B, the internal electrode layer 13 includes a projecting portion 13a which projects from the dielectric layer 12 when seen from the laminating direction. The connection electrode 14 is electrically connected to the internal electrode layer 13 via surfaces and an end face of the internal electrode layer included in the projecting portion 13a of the internal electrode layer 13. Then, particularly in this embodiment, the projecting portion 13a of the internal electrode layer 13 is configured so as to satisfy the following conditions. That is, if the projection amount of the projecting portion 13a of the internal electrode layer 13 with respect to the dielectric layer 12 is designated by L and the thickness of the internal electrode layer 13 is designated by t, then a ratio L/t thereof satisfies the following conditional expression (1).

$$0.5 \leq L/t \leq 120 \quad (1)$$

Note that the projection amount L of the projecting portion 13a refers to the maximum length of a portion where the projecting portion 13a is in contact with (connected to) the connection electrode 14.

With regard to the lower limit ($0.5 \leq L/t$) of this conditional expression, if the projection amount L of the projecting portion 13a is smaller than a half the thickness t of the internal electrode layer, a connection area sufficient for stabilizing the electrical connection between the internal electrode layer 13 and the terminal electrode 14 may not be secured, resulting in an unstable connection state. Moreover, with regard to the upper limit ($L/t \leq 120$) of this conditional expression, if the projection amount L of the projecting portion 13a is too large, then in forming the terminal electrode 14, it is difficult for a terminal electrode material to enter between the projecting portions 13a of the adjacent internal electrode layers 13, and as a result, medical solution during manufacturing is likely to remain. Then, the penetration of humidity due to the residue of the medical solution may be most likely to cause a degradation of the insulation resistance of the manufactured thin-film capacitor, resulting in decrease in the reliability.

Note that a gap may be provided between the dielectric layer 12 as well as the projecting portion 13a of the internal electrode layer 13 and the connection electrode 14. That is, the internal electrode layer 13 may be electrically connected to the connection electrode 14 via at least a part of surfaces (the upper surface and the lower surface) and an end face of the internal electrode layer 13 included in the projecting portion 13a. In the thin-film capacitor, the electric connection of the electrode section might be damaged by expansion/contraction in a heating-cooling cycle during manufacturing or in use, however, if a gap exists in this electrode section, this gap will absorb the expansion/contraction, and therefore a degradation in the electric connection between the dielectric layer 12 as well as the projecting portion 13a and the connection electrode 14 can be suppressed. Hence, the effect of the present invention can be increased further.

The projecting portion 13a of the internal electrode layer 13 projects in either one of two directions from the dielectric layer 12 when seen from a laminating direction, wherein the one direction is the projection direction of the odd-numbered (the first, third, . . . ) internal electrode layers 13 from the base electrode side, and the other one is the projection direction of the even-numbered (the second, fourth, . . . ) internal electrode layers 13 from the base electrode side. Then, in these two directions, the odd-numbered and even-numbered internal electrode layers 13 connect to either one of a pair of connection electrodes 14, respectively. That is, one of the connection electrodes 14 (14a of FIG. 1A) connects to the base electrode 11 and the second, fourth, . . . internal electrode layers 13 from the bottom. The other one of the connection electrodes 14 (14b of FIG. 1A) connects to the first, third, fifth, . . . internal electrode layers 13 from the bottom.

The base electrode 11 may comprise at least any one of Ni, Pt, Pd, Ir, Ru, Rh, Re, Os, Au, Ag, Cu, $IrO_2$, $RuO_2$, $SrRuO_3$, and $LaNiO_3$, for example. The film thickness of the base electrode 11 is preferably 50 to 2000 nm. Moreover, the base electrode 11 and the substrate may comprise the same material. In such a case, for cost reduction, a base metal, such as inexpensive Ni, Cu, or Al, or an alloy of these metals as the principal component, or stainless steel, or Inconel is preferable, and in particular Ni foil is preferable. A total thickness when the base electrode 11 and the supporting substrate comprise the same material is preferably 5 to 500 μm. In this embodiment, Ni foil is used for the base electrode 11, and has a function as a holding member to hold the dielectric layer 12, a function as the lower electrode, and a function as a base to form the dielectric layer 12. In this manner, the base electrode 11 according to this embodiment preferably comprises a metal foil or the like which can be used as the substrate as well as the electrode, however, a substrate/electrode layer structure including a substrate comprising Si, alumina, or the like, and an electrode comprising a metal film may be used as the base electrode 11.

A Perovskite type oxide, such as BT, i.e., barium titanate $BaTiO_3$, BST, i.e., barium titanate strontium $(BaSr)TiO_3$, ST, i.e., strontium titanate $SrTiO_3$, CZ, i.e., zirconic acid calcium $CaZrO_3$, $(BaSr)(TiZr)O_3$, or $BaTiZrO_3$, is suitably used for the dielectric layer 12. The dielectric thin-film 12 may contain one or more of these oxides. The film thickness of the dielectric layer 12 is preferably about 100 to 800 nm.

For cost reduction, the internal electrode layer 13 preferably comprises an inexpensive base metal material as the principal component, and in particular preferably comprises Ni as the principal component. Note that, the internal electrode layer 13 may comprise at least any one of Ni, Pt, Pd, Ir, Ru, Rh, Re, Os, Au, Ag, Cu, $IrO_2$, $RuO_2$, $SrRuO_3$, and $LaNiO_3$, for example. The thickness of the internal electrode layer 13 is preferably about 100 to 800 nm.

For cost reduction, the connection electrode 14 preferably comprises an inexpensive base metal material as the principal component, and in particular preferably comprises Cu as the principal component. Note that the connection electrode 14 may comprise at least any one of Ni, Cu, Ag, and Au, for example.

The passivation film 15 may comprise an insulating resin, such as a polyimide resin, an epoxy resin, a phenol resin, a benzocyclobutene resin, a polyamide resin, or a fluororesin.

The terminal electrode 16 preferably comprises Cu as the principal component. Note that, a layer of Au, Sn, Pd, or the like may be provided in an outer layer of the terminal electrode.

Next, with reference to FIGS. 2A to 2F, a method of manufacturing the thin-film capacitor 10 is described.

Figure 2A:
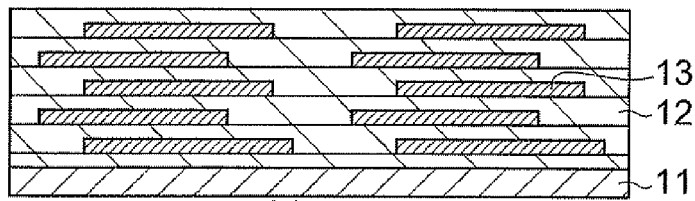
FIGS. 2A to 2F are views illustrating a method of manufacturing the thin-film capacitor according to this embodiment.

First, as shown in FIG. 2A, above the base electrode 11, deposition of the dielectric layer 12 and deposition of the internal electrode layer 13 with a mask are alternately repeated to form a laminated body. At this time, in the internal electrode layer 13, deposition is performed with a mask so that the depositing position may alternately move with a predetermined amplitude for each layer.

Figure 2B:
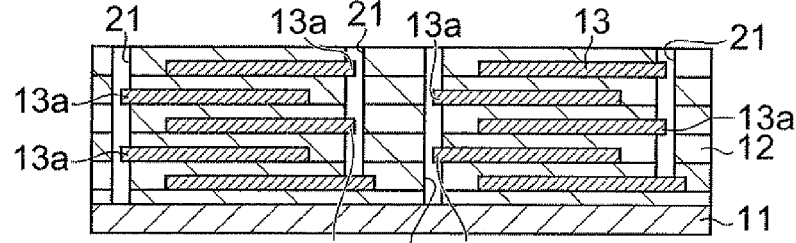

Next, as shown in FIG. 2B, wet etching is performed in the base electrode 11 direction from a surface located on the opposite side of the base electrode 11 in the laminated body so that the projecting portion 13a of the internal electrode layer 13 may be exposed, thereby forming an opening 21. At this time, an etchant which etches the dielectric but does not etch the electrode layer is used. Specifically, if the dielectric film is made of BT, BST, or ST, for example, a preferable etchant is hydrochloric acid+aqueous solution of ammonium fluoride. Moreover, if the dielectric film is made of CZ, a preferable etchant is sulfuric acid+aqueous solution of ammonium fluoride. Here, the projection amount L of the projecting portion 13a which is exposed to the opening 21 by wet etching shall refer to the maximum length in the opening 21 of the projecting portion 13a.

Note that, prior to the wet etching, a slit is made, for example by dicing or the like, or a slit, a via, a through-hole, or the like may be formed by ion milling so as to expose the end face of the internal electrode layer. Thus, the amount of erosion of the dielectric layer by the wet etching treatment is fixed, and therefore the projection amount of the projecting portion of the internal electrode layer can be fixed, thereby suppressing the variation in performances of the thin-film capacitor and further improving the reliability. Moreover, the opening may not be hole-like but a peripheral slit.

Figure 2C:
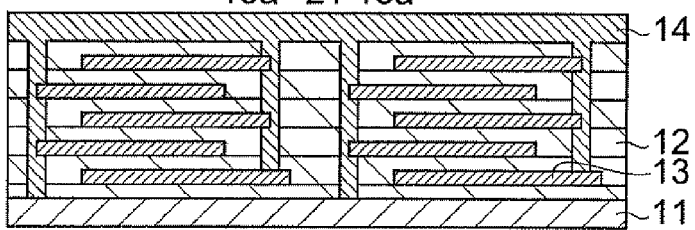
Figure 2D:
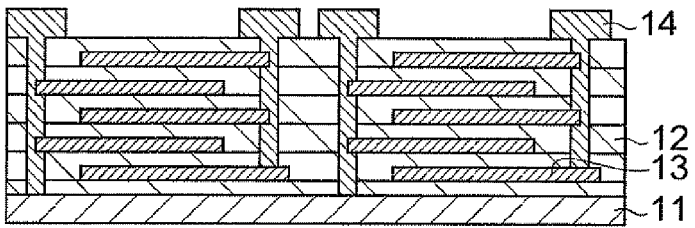
Figure 2E:
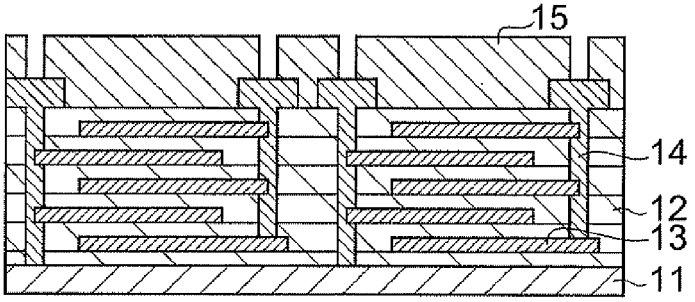

Next, as shown in FIG. 2C, the connection layer is deposited in the opening 21. For example, by sputtering, the connection layer is deposited so as not to produce a gap over the entire surfaces and end face of the projecting portion 13a of the internal electrode layer 13 along the inner wall of the opening.

Figure 2F:
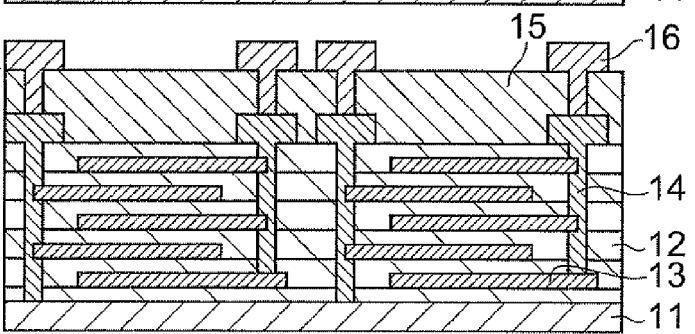

Then, the connection electrode 14 is shaped by patterning (FIG. 2D), the passivation film 15 is formed as required (FIG. 2E), and furthermore by depositing a seed layer and plating the same, the terminal electrode 16 is formed so as to be connected to the connection electrode 14 (FIG. 2F).

Thus, with the thin-film capacitor 10 and the method of manufacturing the thin-film capacitor according to this embodiment, the internal electrode layer 13 connects to the connection electrode 14 via at least a part of the surfaces and an end face of the internal electrode layer 13 included in the projecting portion 13a of the internal electrode layer 13, and therefore the contact area between the both can be increased and the connection state can be stabilized. Furthermore, the internal electrode layer is configured so that the ratio L/t between the projection amount L of the projecting portion 13a of the internal electrode layer 13 with respect to the dielectric layer 12 and the thickness t of the internal electrode layer becomes 0.5 to 120, and thereby the projection amount L of the projecting portion 13a can be within an appropriate range suitable to be able to connect to the connection electrode 14, and the connection state between the internal electrode layer 13 and the connection electrode 14 can be stabilized further. As a result, the electric connection between the internal electrode layer 13 and the connection electrode 14 can be improved. Once the connection state is stabilized, the production yield will increase and the reliability will also improve.

EXAMPLES

Hereinafter, the present invention will be described more specifically using Examples. However, the present invention is not limited to the following Examples.

Example 1

Above the base electrode 11 made of Ni foil, the dielectric layer 12 and the patterned internal electrode layer 13 were alternately deposited by sputtering or the like. Eleven dielectric layers 12 were deposited. Thus, the number of the dielectric layers 12 sandwiched by the Ni substrate 11 and the internal electrode layers 13 is ten. The electrode geometry and the dielectric thickness were set so that one dielectric layer 12 may produce about 10500 pF (10.5 nF).

After depositing the dielectric layers 12 and the internal electrode layers 13, a resist layer was formed which has the opening 21 at a position, where connection to the internal electrode can be made, on the heat-treated assembly. Subsequently, the dielectrics 12 of the opening 21 was etched with an etchant. At this time, an etchant which etches the dielectric layer 12 but does not etch the internal electrode layer 13 was selected. Specifically, as described above, if the dielectric film 12 is made of BT, BST, or ST, for example, then hydrochloric acid+aqueous solution of ammonium fluoride is preferable, and if the dielectric film is made of CZ, sulfuric acid+aqueous solution of ammonium fluoride is preferable. By this etching, the dielectric 12 of the opening 21 is removed and the end portion of the internal electrode layer 13 projects from the side wall of the dielectric 12 of the opening 21, thereby forming the projecting portion 13a. Subsequently, after stripping the resist layer, the conductive layer for connection (terminal electrode 14) was formed in the opening. Furthermore, as required, the passivation layer 15 was formed, and furthermore, the terminal electrode 16 was formed.

Twenty thin-film capacitors were prepared using such a method, the electrostatic capacitances of the respective thin-film capacitors were measured, and the average value and standard deviation thereof were calculated.

Example 2

As with Example 1, the dielectric layers 12 and the internal electrode layers 13 were deposited, and furthermore a resist layer provided with the opening 21 was formed, and subsequently the opening 21 was removed by ion milling. Subsequently, the dielectric side wall of the opening 21 was etched with an etchant. As with Example 1, the capacitances of the capacitors were measured and the average value and standard deviation thereof were calculated.

Example 3

A laminated body similar to that of Example 1 was prepared, and a slit was formed at a place located in the opening 21 for connecting the internal electrode layer 13 by dicing or the like. Subsequently, the dielectric of the end face portion of the internal electrode layer 13 was etched with a dielectric etchant. As with Example 1, the capacitances of the capacitors were measured and the average value and standard deviation thereof were calculated.

Comparative Example

As with Example 1, the dielectric layers 12 and the internal electrode layers 13 were deposited, and furthermore a resist layer provided with the opening 21 was formed, and subsequently the opening 21 was removed by ion milling. Subsequently, without etching the dielectric in the side wall of the opening 21, the conductive layer for connection (terminal electrode 14) was formed as with Example 1, and the capacitances of the capacitors were measured, and the average value and standard deviation thereof were calculated.

The average value and standard deviation of the electrostatic capacitance with regard to the above-described Examples 1 to 3 and Comparative Example are shown in Table 1.

TABLE 1

|  | Average electrostatic capacitance value (nF) | Standard deviation of electrostatic capacitance |
|---|---|---|
| Example 1 | 107.85 | 2.57 |
| Example 2 | 105.40 | 2.99 |
| Example 3 | 102.85 | 2.80 |
| Comparative Example | 96.95 | 10.82 |

As shown in Table 1, it was confirmed in Examples 1 to 3, wherein the projecting portion 13a is formed by etching the dielectric of the opening 21 and thereby projecting the internal electrode layer 13 to the opening 21 and wherein the connection electrode 14 is formed so as to electrically contact with the whole projecting portion 13a, that the electrostatic capacitance of the thin-film capacitor has almost the same value as the setting value (10.5 nF per layer, and 105 nF as a total). On the other hand, it was confirmed in Comparative Example, wherein the internal electrode layer 13 is not provided with the projecting portion 13a and the connection electrode 14 connects only to the end face of the internal electrode layer 13, that the electrostatic capacitance of the thin-film capacitor has a value smaller than the above-described setting value. Moreover, it was confirmed that the standard deviation also increases about four times as compared with Examples 1 to 3.

That is, it was confirmed that the thin-film capacitors in Examples each have a sufficient electrostatic capacitance as compared with Comparative Example, that the variation in the electrostatic capacitance can be reduced, and that stable electric connection between the internal electrode layer and the connection electrode can be made.

Next, the effect caused by the projection amount of the projecting portion 13a of the internal electrode layer 13 is described.

Two hundred thin-film capacitors were prepared wherein the ratio L/t between the projection amount L of the projecting portion 13a of the internal electrode layer 13 and the thickness t of the internal electrode layer 13 is −0.24, 0, 0.45, 0.5, 0.52, 1.01, 1.94, 5, 12, 25, 52, 80, 105, 120 and 123, respectively. As the preparation method, for L/t=0, the thin-film capacitors were prepared using the method shown in Comparative Example. For L/t=−0.24, the thin-film capacitors were prepared by denting the internal electrode from the dielectric side wall of the opening 21 by wet etching in addition to the ion milling shown in Comparative Example. For other L/t, the thin-film capacitors were prepared by suitably using the methods shown in Examples 1 to 3.

For the prepared thin-film capacitors, the electrostatic capacitance after forming the connection electrode 14 was measured, and the average value was calculated for every 200 pieces having the same L/t value. Moreover, a thermal shock test (−45° C. to +85° C., 500 times) was conducted, and the defective rate of the capacitors after the test was measured for every 200 pieces having the same L/t value (thin-film capacitor whose capacitance varied by 8% or more was determined as defective). Furthermore, an anti-humidity load test (60° C., 90% RH, 20 Vdc was applied, 200 Hr) was conducted, and the defective rate of the capacitors after the test was measured for every 200 pieces having the same L/t value (thin-film capacitor whose insulation resistance value decreased to 1 Mohm or less was determined as defective).

The average electrostatic capacitance value (nF), the defective rate (%) after the thermal shock test, and the defective rate (%) after the anti-humidity load test, for each L/t value, with regard to the above-described measurement results are shown in Table 2.

TABLE 2

| L/t | Average electrostatic capacitance value (nF) | Defective rate after thermal shock test (%) | Defective rate after anti-humidity load test (%) |
|---|---|---|---|
| −0.24 | 59.5 | 17.0 | 0 |
| 0 | 97.0 | 6.5 | 0 |
| 0.45 | 98.2 | 1.1 | 0 |
| 0.50 | 104.6 | 0 | 0 |
| 0.52 | 104.5 | 0 | 0 |
| 1.01 | 107.8 | 0 | 0 |
| 1.94 | 106.5 | 0 | 0 |
| 5 | 107.0 | 0 | 0 |
| 12 | 106.0 | 0 | 0 |
| 25 | 107.4 | 0 | 0 |
| 52 | 104.6 | 0 | 0 |
| 80 | 103.2 | 0 | 0 |
| 105 | 102.1 | 0 | 0 |
| 120 | 101.2 | 0 | 0 |
| 123 | 101.4 | 0 | 2.5 |

As shown in Table 2, for L/t of 0.5 or more, the electrostatic capacitance has almost the same desired value as the setting value (10.5 nF per layer, and 105 nF as a total), and the defective rate after the thermal shock test is 0%. That is, for L/t less than 0.5, the electrostatic capacitance sufficient for the setting value cannot be obtained and defects occur after the thermal shock test, and a problem of a decrease in the reliability of the connection state between the internal electrode layer 13 and the connection conductor (connection electrode 14) occurs.

On the other hand, when L/t exceeds 120, although there is a sufficient electrostatic capacitance, defects occur after the anti-humidity load test. The reason for this may be that the projection amount of the projecting portion 13a was too large and thus a large gap remained in the connection part between the internal electrode layer 13 and the connection conductor (connection electrode 14) in forming the connection electrode 14, and as a result a residue of the medical solution during manufacturing caused a phenomenon of a degradation in the insulation resistance due to the penetration of humidity.

Thus, it was confirmed that the thin-film capacitor whose L/t satisfies 0.5≤L/t≤120 have sufficient electrostatic capacitance for the setting value, and that stable electric connection between the internal electrode layer 13 and the connection electrode 14 was made without causing a defect even after the thermal shock test and the anti-humidity load test, and that this thin-film capacitor has high reliability.

What is claimed is:
1. A thin-film capacitor comprising:
two or more dielectric layers deposited above a base electrode;
an internal electrode layer being deposited between the dielectric layers and having a projecting portion which projects from the dielectric layer at a point without its end portion when seen from a laminating direction; and
a connection electrode, provided at an opening which penetrates through the two or more dielectric layers and the internal electrode layer, electrically connected to the internal electrode layer via at least a part of a surface and an end face of the internal electrode layer included in the projecting portion which is exposed to the opening, wherein:

a ratio L/t between a projection amount L of the projecting portion of the internal electrode layer with respect to the dielectric layer and a thickness t of the internal electrode layer is 0.5 to 120, the internal electrode does not have a through-hole where the opening is formed.

2. A method of manufacturing a thin-film capacitor, comprising the steps of:

forming a laminated body wherein a dielectric layer and an internal electrode layer are alternately deposited above a base electrode;

providing at an opening which penetrates through the two or more dielectric layers and the internal electrode layer and exposing an end portion of the internal electrode layer so that it projects from the dielectric layer at inside of the opening when seen from a laminating direction of the laminated body and performing wet etching so as to form a projecting portion, such that the internal electrode is not etched when the opening is formed; and forming a terminal electrode so as to be electrically connected to the internal electrode layer via at least a part of a surface and an end face of the internal electrode layer included in the projecting portion which is formed by performing the wet-etching, wherein the step of performing the wet etching forms the projecting portion by performing wet-etching so that a ratio L/t between a projection amount L of the projecting portion of the internal electrode layer with respect to the dielectric layer and a thickness t of the internal electrode layer becomes 0.5 to 120.

3. The method of manufacturing a thin-film capacitor according to claim 2, further comprising, after the step of forming the laminated body and prior to the step of performing the wet etching, the step of exposing an end face of the internal electrode layer.

4. The thin-film capacitor according to claim 1, further comprising, a gap provided between the dielectric layer as well as the projecting portion of the internal electrode layer and the connection electrode.

5. The method of manufacturing a thin-film capacitor according to claim 2, further comprising, a gap provided between the dielectric layer as well as the projecting portion of the internal electrode layer and the connection electrode.

6. The thin film capacitor according to claim 1, wherein the connection electrode does not penetrate beyond the base electrode.

* * * * *